(12) United States Patent
Webb

(10) Patent No.: US 9,079,723 B2
(45) Date of Patent: Jul. 14, 2015

(54) PAPER FEEDER AND METHOD OF FEEDING PAPER

(75) Inventor: Donald B. Webb, Mt. Nathan (AU)

(73) Assignee: FIBRECYCLE PTY LTD, Queensland (AU)

( * ) Notice: Subject to any disclaimer, the term of this patent is extended or adjusted under 35 U.S.C. 154(b) by 0 days.

(21) Appl. No.: 13/882,977

(22) PCT Filed: Oct. 28, 2011

(86) PCT No.: PCT/AU2011/001386
§ 371 (c)(1),
(2), (4) Date: Jul. 25, 2013

(87) PCT Pub. No.: WO2012/058710
PCT Pub. Date: May 10, 2012

(65) Prior Publication Data
US 2013/0292228 A1      Nov. 7, 2013

(30) Foreign Application Priority Data

Nov. 3, 2010   (AU) ................................ 2010904893

(51) Int. Cl.
   *B65G 47/19*      (2006.01)
   *D21B 1/08*       (2006.01)
   *B65G 47/29*      (2006.01)

(52) U.S. Cl.
   CPC ............. *B65G 47/19* (2013.01); *B65G 47/29* (2013.01); *D21B 1/08* (2013.01)

(58) Field of Classification Search
   CPC ..................................................... B65G 47/19
   USPC ............ 198/529, 530, 531, 534, 550.2, 459.2
   See application file for complete search history.

(56) References Cited

U.S. PATENT DOCUMENTS

| | | | | |
|---|---|---|---|---|
| 2,756,972 A * | 7/1956 | Stokes et al. | | 366/189 |
| 3,147,883 A * | 9/1964 | Jakobson | | 222/1 |
| 3,450,440 A * | 6/1969 | Hagenah | | 406/81 |
| 4,060,167 A * | 11/1977 | Smith | | 198/622 |
| 4,566,942 A | 1/1986 | Holz et al. | | |
| 5,129,505 A | 7/1992 | Winter et al. | | |
| 6,076,684 A | 6/2000 | Bollegraaf | | |
| 6,216,850 B1 * | 4/2001 | Svejkovksy et al. | | 198/771 |
| 7,028,830 B2 * | 4/2006 | Beesley et al. | | 198/594 |
| 8,060,989 B2 * | 11/2011 | Pierret et al. | | 19/97.5 |
| 8,070,083 B2 * | 12/2011 | Kokko | | 241/68 |

FOREIGN PATENT DOCUMENTS

DE   2822188 A1   1/1979
EP   1101716 A1   5/2001

OTHER PUBLICATIONS

International Search Report, PCT/AU2011/001386, mailed Jan. 23, 2012.
PCT Notification of International Preliminary Report on Patentability, mailed Sep. 17, 2012.
European Supplementary Search Report, EP11837319, mailed May 8, 2014.

* cited by examiner

*Primary Examiner* — Leslie A Nicholson, III
*Assistant Examiner* — Keith R Campbell
(74) *Attorney, Agent, or Firm* — Marvin Petry; Stites & Harbison PLLC

(57) ABSTRACT

A method of feeding paper through a paper feeder by conveying paper along a path and regulating the through-flow of paper from the path to dispense the paper from the feeder at a controlled flow rate while continuously moving the paper to avoid blockages.

16 Claims, 10 Drawing Sheets

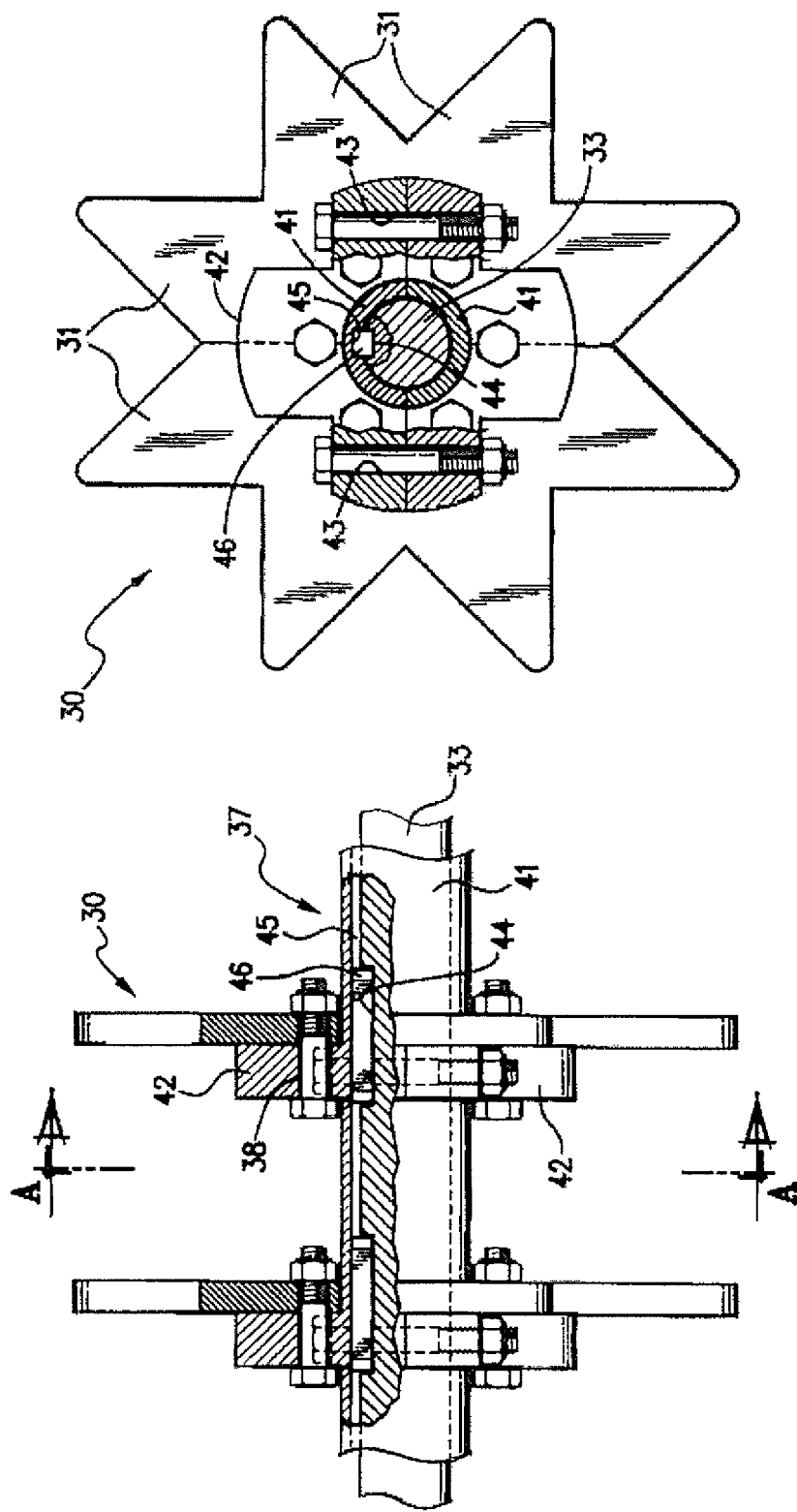

PAPER FEEDER AND METHOD OF FEEDING PAPER

FIELD OF THE INVENTION

The present invention relates to feeding paper to a paper processing system.

BACKGROUND OF THE INVENTION

In recyclable paper processing systems, raw material in the form of recyclable paper and old newspaper ("ONP") and the like is fed to a grinder which grinds the paper before the ground material is mixed with water. The resulting particulate, or pulp, is then subjected to further processing depending on the product to be formed from the recycled paper.

Conventionally, the feed of recyclable paper to recyclable paper processing systems has been regulated manually. This is because no suitable systems have been available to provide automated paper feed. Manual regulation of the paper feed, however, has a number of drawbacks including the requirement to have one or more persons dedicated to that function. Another problem is that feeding of the material to the system manually relies on the operator's "judgement" rather than providing a correctly needed amount for the system. As a result the performance of the processing system downstream is usually less than optimum due to overfeeding or underfeeding of paper to the grinder.

SUMMARY OF THE INVENTION

In accordance with one aspect, the present invention provides a method of feeding paper through a paper feeder by conveying paper along a path and regulating the through-flow of paper from the path to dispense the paper from the feeder at a controlled flow rate while continuously moving the paper to avoid blockages.

In one embodiment, the method includes conveying paper at a controlled flow rate in response to feedback to a controller from sensors positioned along the path, and sensing the amount of paper entering the paper feeder and the amount of paper discharging the paper feeder. As a result, the method includes adjusting the speed of a conveyor on which the paper is conveyed, in response to the sensors.

In another embodiment, the method includes regulating the flow of paper by conveying the paper up and over a barrier in the path, wherein the barrier is a wall of rotatable elements arranged in horizontal banks, and the elements are driven to convey the paper up and over the wall by traction.

The method may also include further regulating the flow of paper by conveying the paper under a barrier. In this embodiment, the barrier sweeps back a build up of paper being conveyed. A sensor upstream of the barrier senses a build up of paper by way of the sweeping back of paper by the barrier and, through a controller, adjusts the flow rate of paper being conveyed.

In another aspect, the invention provides a paper feeder comprising a holding container having an inlet through which paper is deposited, a conveyor for moving the paper in the holding container towards a discharge outlet, and a regulator for regulating the through-flow of paper from the conveyor to dispense through the discharge outlet at a controlled flow rate while continuously moving the paper to avoid blockages.

In one embodiment, the paper feeder may further comprise a control system for controlling the flow rate of paper through the paper feeder in response to feedback from sensors positioned in the paper feeder and/or in a downstream process from the paper feeder.

In one embodiment, the regulator is a barrier up and over which the paper is conveyed by traction. The barrier is positioned inside the holding container and at the end of an endless belt conveyor that conveys paper towards the discharge outlet. The barrier may be a wall of rotatable elements arranged in horizontal banks wherein the elements are driven to rotate to move the paper up and over the wall, and toward the discharge outlet. The wall of rotatable elements may be inclined vertically against a direction of flow of the paper to encourage continuous flow of paper up the barrier and avoid blockages. The elements are mounted on a common shaft in each bank and are horizontally staggered relative to the elements in the bank immediately above and below. Each rotatable element comprises at least two engageable portions to enable each element to be individually mounted onto, and dismounted from, a shaft.

The paper feeder in one embodiment could also include a tipper comprising at least one bank of rotatable elements and positioned near an upper end of the barrier whereby the elements are driven to rotate to assist in conveying the paper over the barrier.

In an embodiment, the rotatable elements comprise an annular 'star'-shaped disc whereby the spikes defining the star points catch the paper to convey the paper upwardly.

The regulator may alternatively or additionally be a movable barrier under which paper is conveyed wherein the barrier moves to sweep paper back upstream of the discharge outlet if there is a build up of paper. A sensor located upstream of the barrier senses build up of paper swept back by the barrier, and based on feedback from the sensor, the controller adjusts a speed of the conveyor.

The container may comprise a discharge head, in which the regulator is mounted. The discharge head may comprise a hood, positioned over the regulator.

In use, the rotatable elements of the tipper may counter rotate relative to the rotatable elements of the wall. The rotatable elements may rotate at a greater speed of rotation relative to the rotatable elements of the wall, as controlled by the controller and depending on the feedback from the sensors. The angle between adjacent sides of each spike alternate between approximately 90° and approximately 45°.

The assembly may comprise a mounting member for each rotatable element to attach to so as to mount the element to a rotatable shaft. Each rotatable element may comprise two or more portions, separately mountable to each element's respective mounting member.

Each mounting member may comprise two or more mounting portions, fastenable together to form the mounting member.

Each mounting member may comprise a casing portion for encasing a portion of the rotatable shaft which the rotatable element is to be mounted to.

Each mounting portion may comprise one or more tabs for the rotatable elements to be fastened to.

The mounting portions may comprise a plurality of grooves formed in each shaft, a respective groove in each mounting member, and a plurality of keys, each key comprising a rod receivable in a groove of one of the shafts and the corresponding groove of one of the mounting portions to prevent the mounting portions from rotating relative to their respective shafts.

The endless belt conveyor may move about at least two rollers. One roller may be a variable drive roller. The speed of the belt may be varied by the controller to control the discharge rate of the discharger.

The assembly may also comprise a maximum flow limiter in the form of a regulating barrier under which the paper is conveyed, and which limits the flow of paper being fed by the assembly to a downstream paper processing system.

The maximum flow limiter may be located downstream of the discharger and may comprise a carrier, or a conveyor, configured to receive and move paper discharged by the wall of rotating elements and a barrier located relative to the carrier to define a space between the barrier and the carrier through which the carrier carries paper. The space limits the maximum volume of paper exiting the assembly relative to the speed the carrier moves the paper.

The carrier may be a conveyor, which may be the same conveyor that moves paper to the discharge outlet, or may be independent of that conveyor.

The barrier may comprise a plate member, or paddle, mounted above the carrier. The plate member may be configured to rotate, preferably continuously, so as to send excess paper back in the opposite direction to which the paper is being carried by the carrier. The maximum flow limiter may comprise a housing for housing the barrier and at least part of the carrier.

The paper feeder may further comprise a control system for controlling the operation of the feeder, the control system comprising a filling control for controlling the filling of the container with paper, a discharging control for controlling the discharging of the paper from the container and a controller for operating the control system.

The filling control may comprise a container level sensor for detecting the amount of paper in the container.

The discharging control may comprise a surge point volume sensor for detecting the volume of material exiting the container. The discharging control may also comprise the maximum flow limiter, if present in the assembly.

The discharging control may comprise a current load sensor for detecting the current load on a motor driving a grinder of the paper processing system, the grinder grinding the paper fed from the paper feeder.

The discharging control may comprise a discharge level sensor for detecting the level of paper discharged from the container onto a feed conveyor to the paper processing system.

BRIEF DESCRIPTION OF THE DRAWINGS

Embodiments of the present invention will now be described by way of example with reference to the accompanying drawings, wherein:

FIGS. 9 and 10 are side and end views of the elements mounted to the shaft; and

DETAILED DESCRIPTION OF EMBODIMENTS

Figure 1:
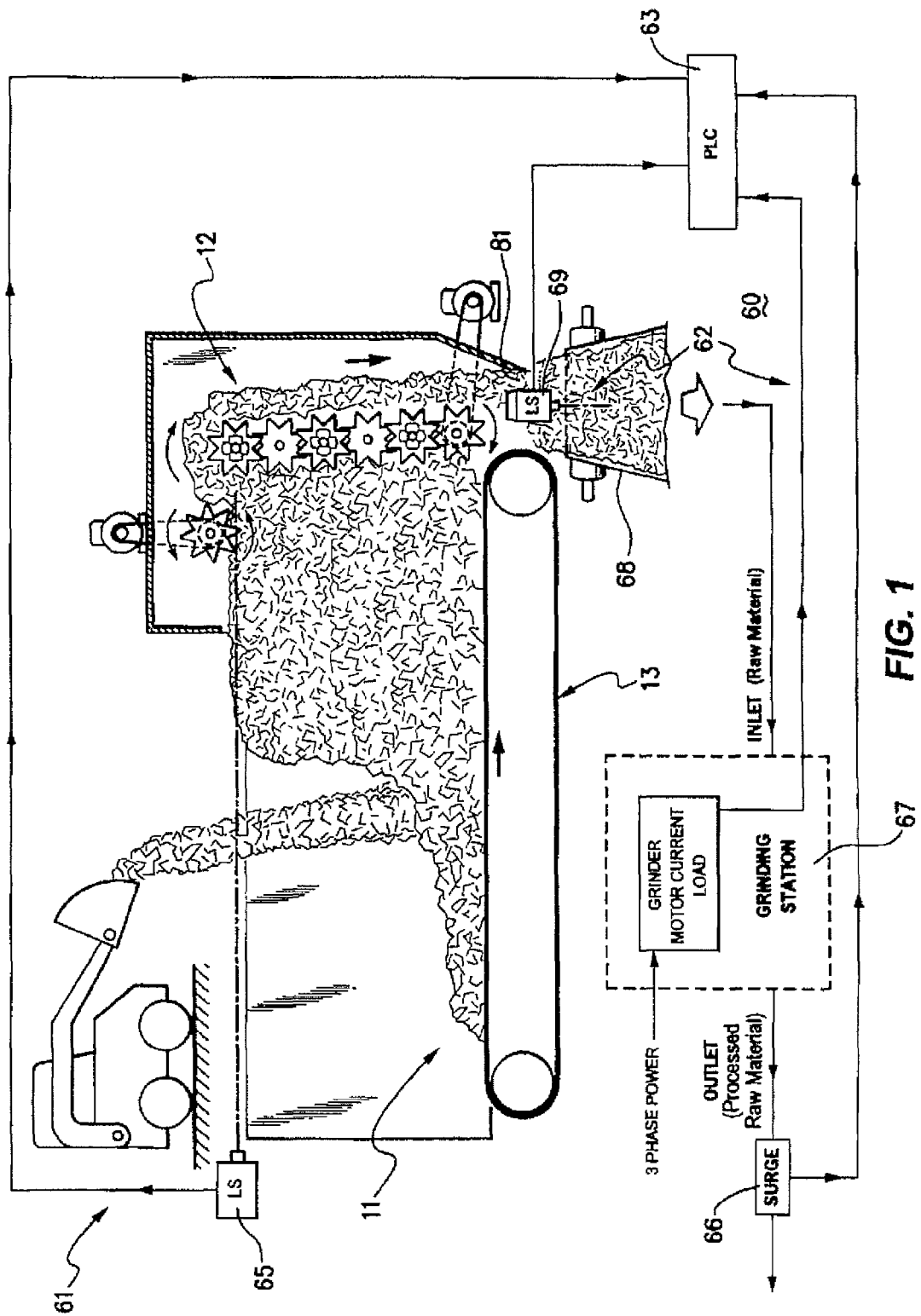
FIG. 1 is a schematic diagram of an assembly for feeding paper to a recyclable paper processing system according to an embodiment of the present invention.
Figure 2:
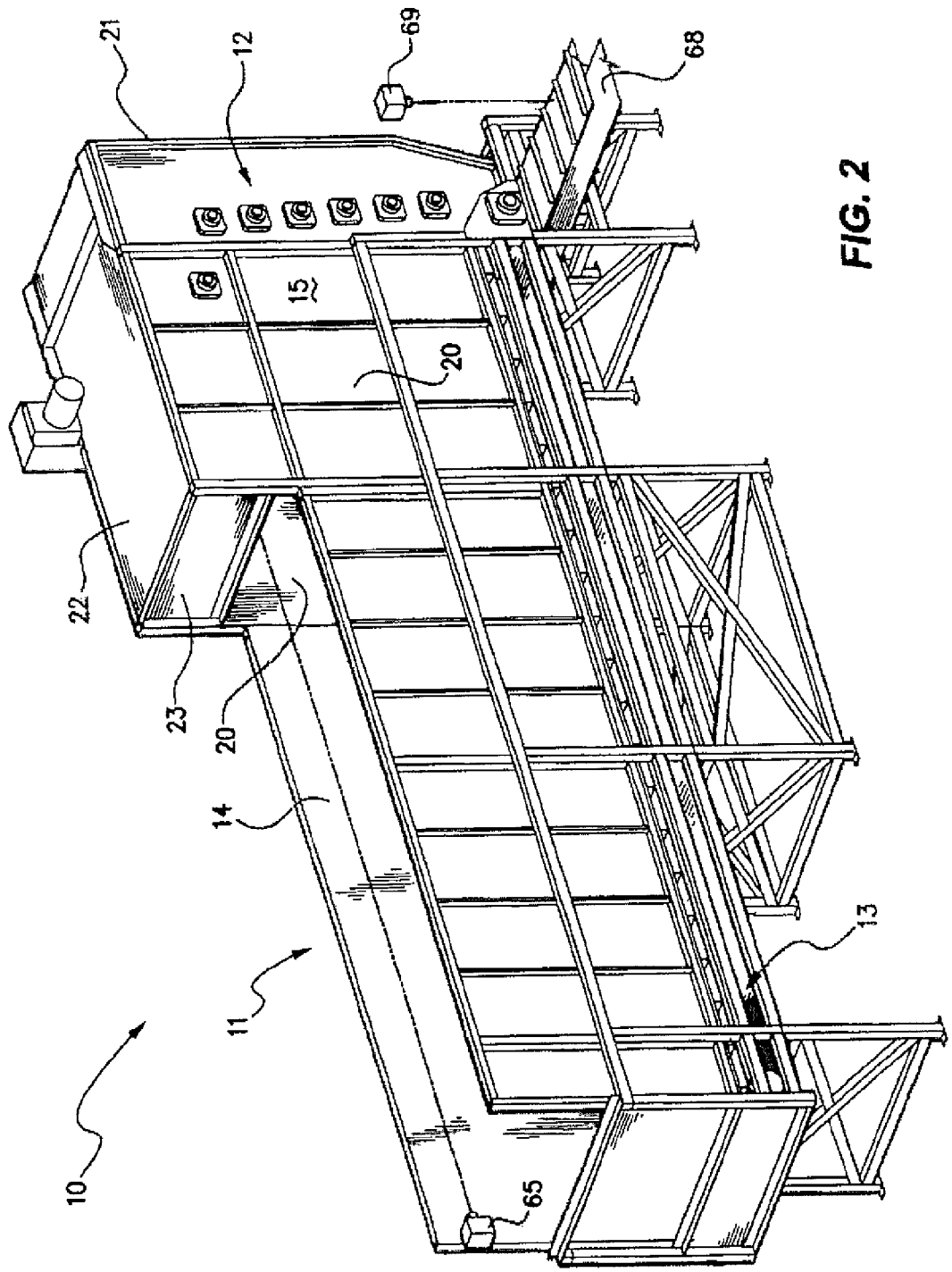
FIG. 2 is a perspective view of an assembly for feeding paper to a recyclable paper processing system according to an embodiment to the present invention.
Figure 3:
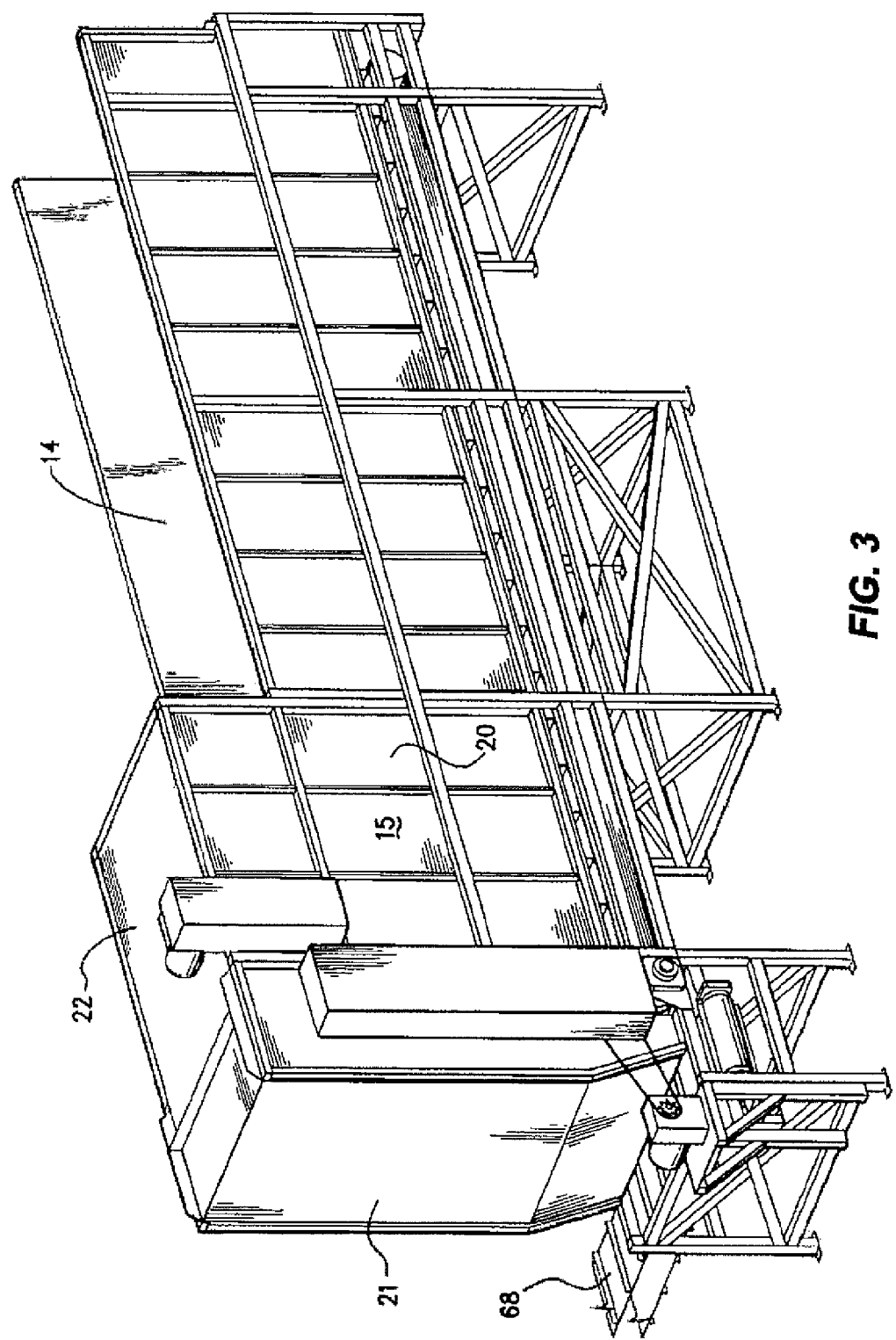
FIG. 3 is a reverse perspective view of the assembly of FIG. 2.
Figure 4:
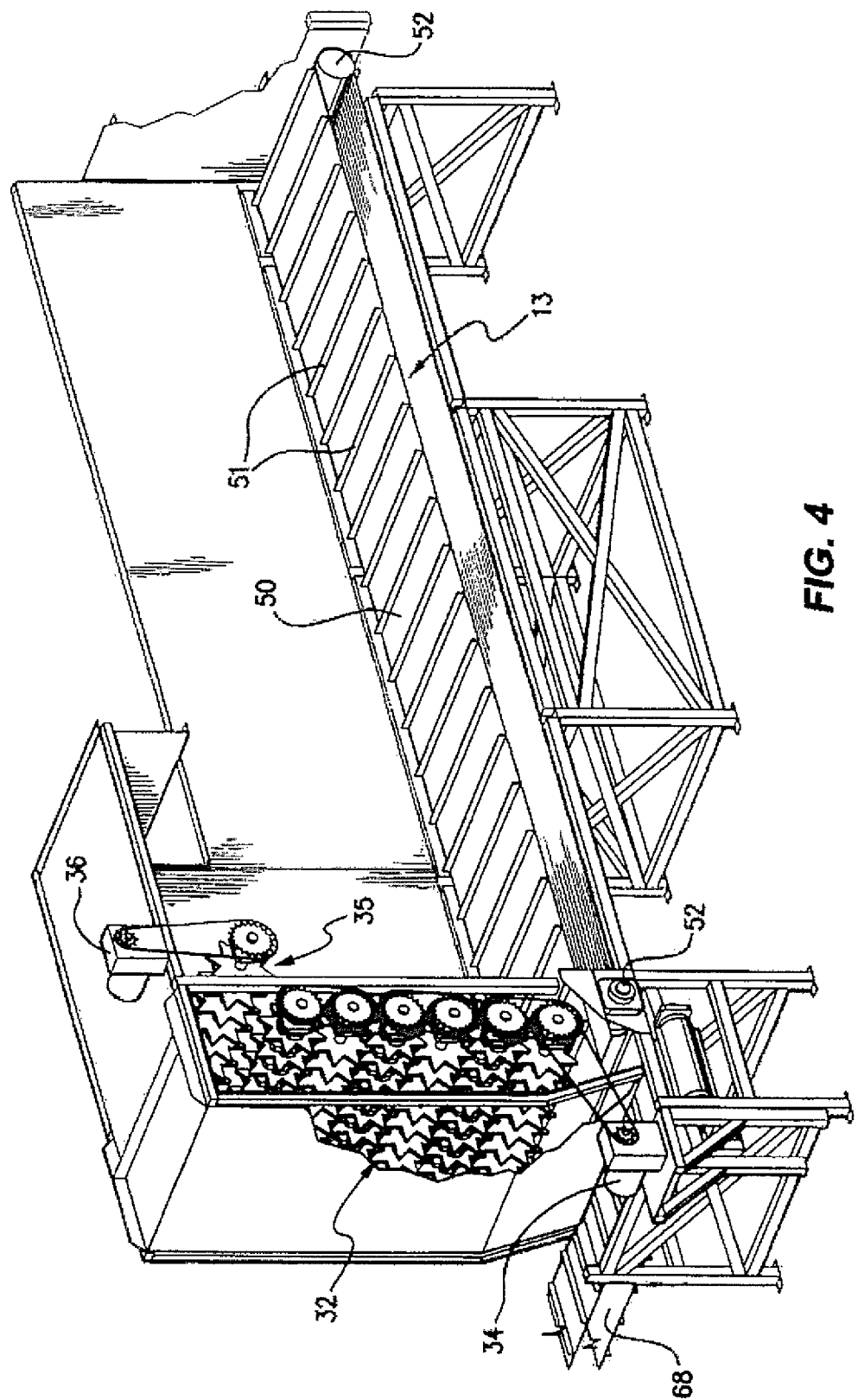
FIG. 4 is a cut away perspective view of the assembly of FIG. 2.
Figure 5:
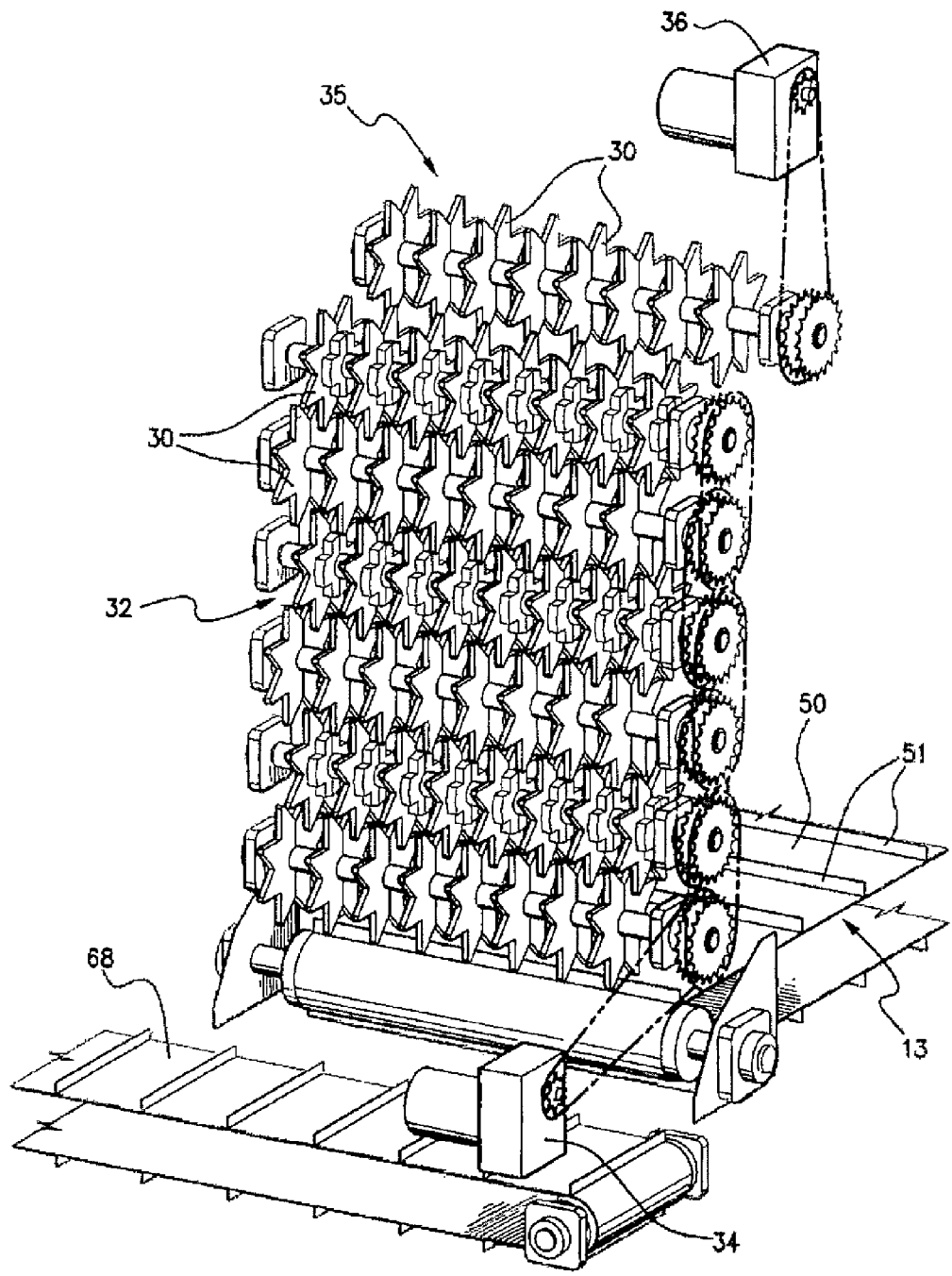
FIG. 5 is a perspective view in isolation of a discharger of the assembly of FIG. 2.
Figure 6A:
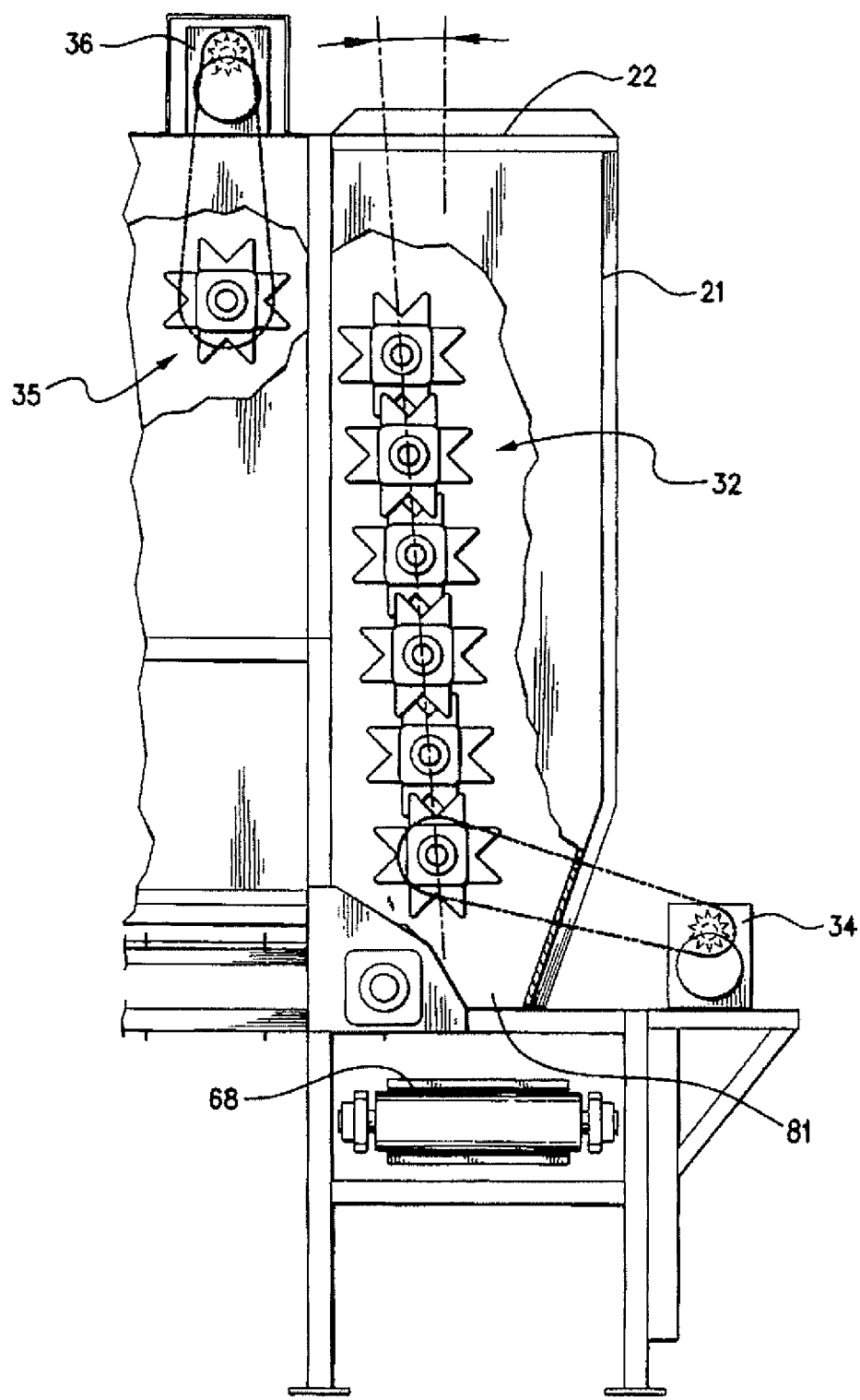
FIGS. 6a and 6b are side and end views respectively of the assembly of FIG. 5.
Figure 6B:
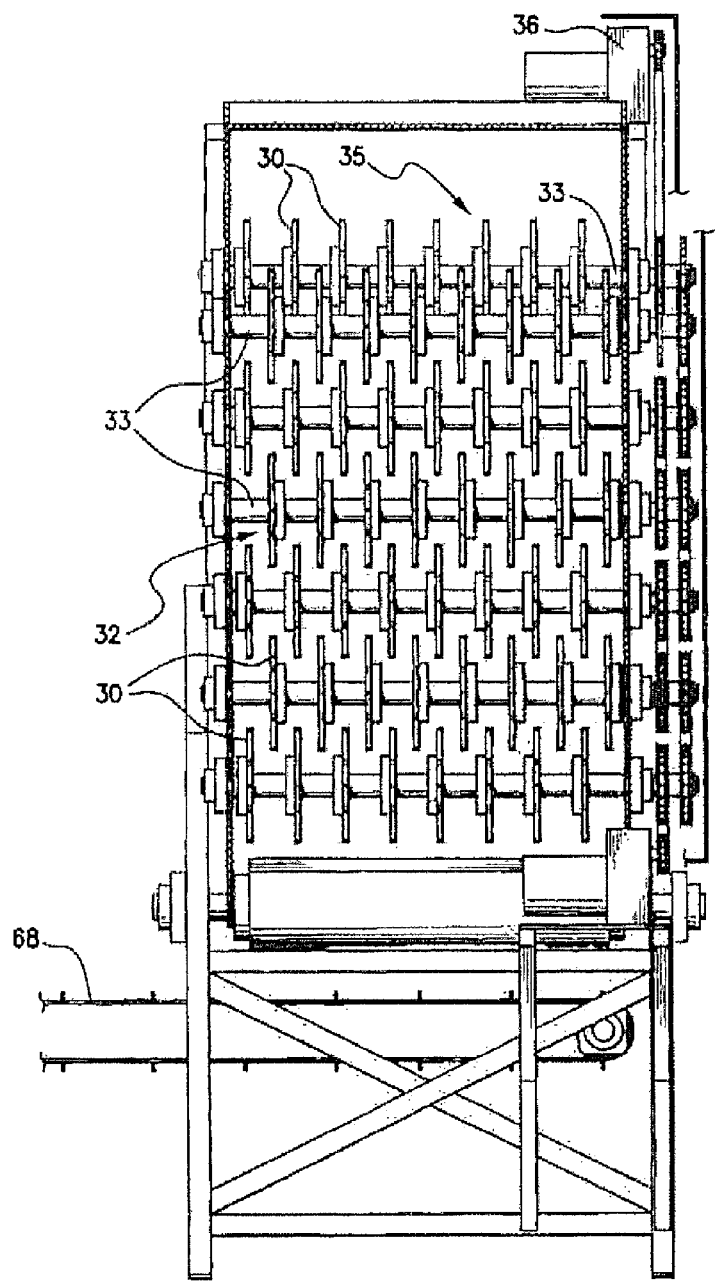

Referring to the Figures, there is shown an assembly 10 (a paper feeder) for feeding paper to a recyclable paper processing system at a controlled rate. The assembly 10 comprises generally a container 11 for holding a mass of paper, a regulator for regulating the through-flow of discharging paper from the container 11 through a discharge outlet 81. The form the regulator takes in the embodiment described and illustrated is referred to as a 'discharger' 12 as that device is located to discharge paper through the outlet 81. A moving mechanism 13, or a conveyor, conveys the mass of paper towards the discharger 12. The assembly 10 operates to dispense paper through the outlet at a controlled flow rate while continuously moving the paper to avoid blockages. Advantageously, a large mass of paper can be deposited into the container and the through-flow of paper regulated by the discharger before exiting through a discharge outlet at a controlled and constant pace. This avoids the need of a dedicated person manually and continuously feeding the paper feeder to avoid build up of paper at the discharge outlet, which is a constriction and a typically point of jamming. Similarly, the method of feeding paper through the paper feed assembly is by conveying paper along a path and regulating the through-flow of paper to dispense the paper from the feeder at a controlled flow rate while continuously moving the paper to avoid blockages.

The container 11 may be described as a bin or hopper and comprises an open feed trough 14 at one end and a discharge head 15 at an opposing end. The moving mechanism 13 in the form of a conveyor is located inside the container 11. Paper which might be old newspaper ("ONP") or any other paper is cleaned to remove any foreign material before being periodically loaded into the trough 14 on top of the conveyor (moving mechanism 13) as required in order to provide a sufficient mass of paper in the container 11. The discharger 12 is mounted in the discharge head 15 of the container 11, the discharge head 15 receiving paper from the trough 14 as it is moved by the moving mechanism 13. The discharge head 15 has a hood positioned over the discharger 12. The hood partially encloses the discharger 12 to reduce the spread of dust from the assembly 10 by the discharging process. More specifically, the discharge head 15 comprises side walls 20, an end wall 21 opposing the opening in the discharger head through which paper is moved by the moving mechanism, a roof 22 and an overhang 23 opposing the end wall 21. The roof 22 and the overhang 23 form the hood of the discharge head 15.

The discharger 12 comprises a plurality of rotatable elements 30 which engage pieces of paper in the paper mass to move the pieces of paper to discharge the paper from the container 11 as they rotate. The discharger 12 comprises a wall 32 of these elements 30 arranged in a number of banks, with each element in a bank mounted on a common rotatable shaft 33. The wall 32 forms a barrier at the end of the container 11 to the exit from the container 11 for the mass of paper. The discharger 12 operates to regulate the through-flow of paper being conveyed by moving pieces of paper by traction from one side of the wall 32 to the other side to discharge the paper from the container 11 through an outlet 81 at the bottom of the container 11. Discharged paper is taken from the outlet 81 to the downstream units of recyclable paper processing system by for example a feed conveyor 68 as shown in the Figures.

The elements in each bank of the wall 32 overlap in the horizontal and vertical planes with the elements in the banks above and below. Namely, the elements are staggered with respect to those in the banks immediately above and below. This is to prevent paper from inadvertently slipping between the elements in the wall 32 to bypass the discharger 12 and exit the container 11. It also means that the elements are self-cleaning in that the spaces between horizontally adjacent elements are kept free of paper by the vertically adjacent elements, ensuring that paper does not accumulate and jam between the shafts 33.

Each bank of elements in the wall 32 is positioned horizontally closer to the moving mechanism 13 than the banks vertically below, ie. is positioned closer to the end of the container 11 furthest from the discharger 12. Thus, the wall 32 is angled or inclined vertically against the direction of paper flow and towards the moving mechanism 13 (and towards the end of the container 11 furthest from the discharger 12). The purpose of this is to ensure that the discharger does not "pick up" the whole mass of paper in the container 11, but rather a generally even draw of paper is taken vertically from the mass of paper to be discharged from the container 11. The force of the mass of paper being conveyed against the discharger 12 assists in ensuring an even draw of paper is taken up by the discharger.

In the embodiment shown in the Figures, the wall 32 comprises six banks of eight elements 30. However, it is understood that the wall 32 may comprise more or less banks and that each bank may comprise more or less elements. In general, the wider the container 11, the more the number of elements 30 required in each bank so as to ensure that there are no "gaps" in the wall 32 for paper to inadvertently slip through. In addition, the wall 32 needs to be higher than the height of the open feed trough 14 of the container 11 so that paper doesn't readily spill over the wall. The banks of elements in the wall 32 are driven to rotate by a common drive 34 and thus, in use, have a common rotational speed. However, if desired, separate drives can be provided for one or more of the banks.

The discharger 12 also comprises a tipper 35 for assisting the paper engaged by the elements of the wall 32 in being tipped over the top of the wall 32. The tipper 35 also serves to prevent paper lifted up by the elements of the wall 32 from falling back under its own weight. The tipper 35 comprises at least one bank of the rotatable elements 30 described above. The tipper 35 is located in the container 11 and positioned upwardly and inwardly from the wall 32. The elements of the tipper 35 are arranged to counter rotate to the elements of the wall 32. The elements of the tipper 35 also rotate at a slightly greater speed than the elements of the wall 32 so as to "flick" the paper at the top of the wall 32 over the top of the wall 32. An additional drive 36 is provided to rotate the tipper 35.

Each element 30 comprises a generally annular and flat disc having a plurality of rounded spikes 31 for engaging, or catching, pieces of paper at the bottom of their path of rotation, effectively "picking up" the pieces of paper. The tips of the spikes are sufficiently pointed to impart traction, or grip, on the moving paper, but not so pointed as to pierce the paper, which would make removal therefrom difficult.

As the elements rotate 30, they lift the pieces of paper engaged by the spikes and push them onto the elements above. This movement of paper occurs substantially vertically up the inclined wall 32 until the pieces of paper reach the uppermost bank of elements of the wall. As these uppermost elements rotate, the pieces of paper engaged thereto, are pulled "over" the wall (with the assistance of the tipper 35). On the other side of the wall, the pieces of paper disengage from the spikes of the elements under gravity and fall to the container outlet.

The spikes 31 each comprise an outward projecting triangular segment and are arranged such that every alternate angle between the sides of adjacent spikes is approximately 90° while the other angles between adjacent spikes are 45°. In the representations shown in the drawings, this arrangement creates an element with eight spikes. Each spike has a circular pitch of approximately 45°. The spikes 31 of each element are shaped in this way so as to provide good vertical conveying of the paper whilst retaining sufficient strength to maintain integrity under load.

Figure 7:
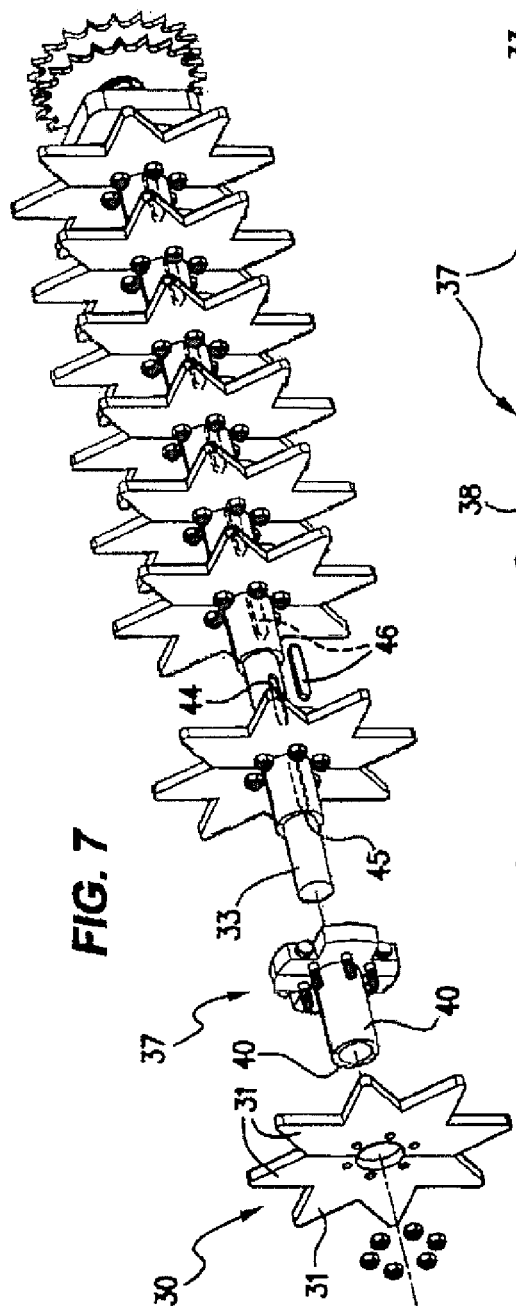
FIGS. 7 and 8 are exploded perspective views of rotatable elements mounted to a common rotatable shaft of the discharger of FIG. 5.
Figure 8:
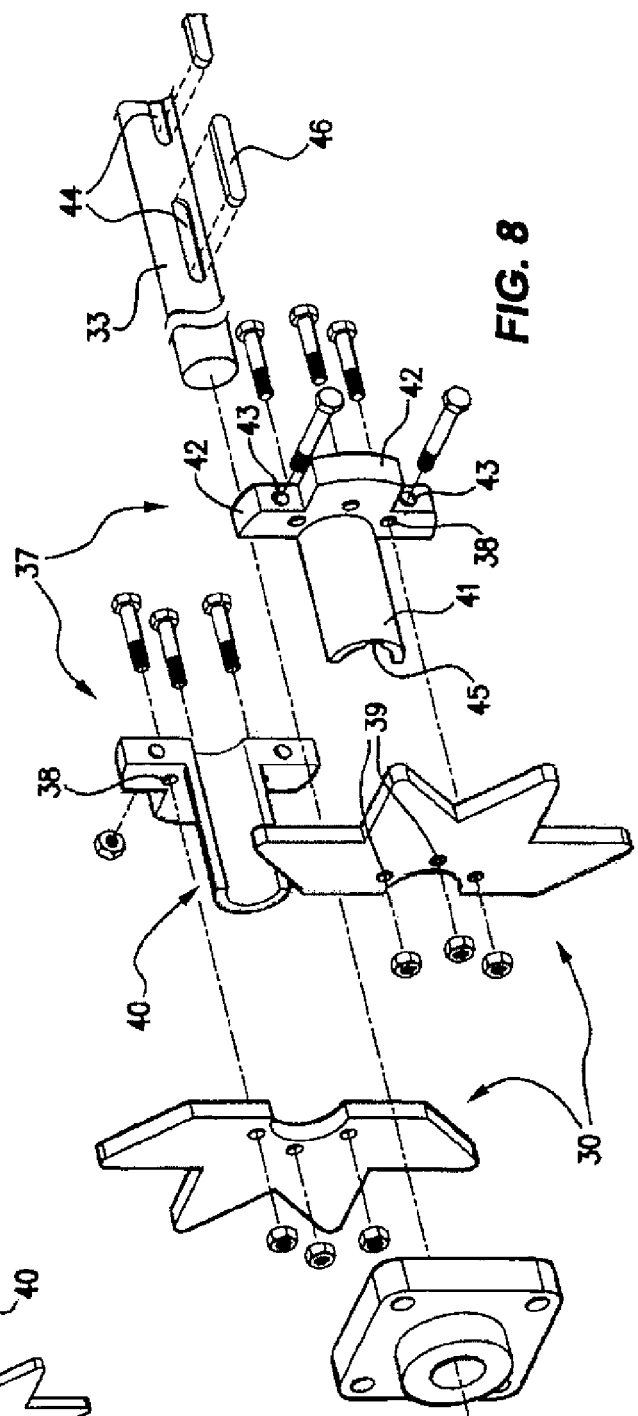

Each element 30 comprises eight spikes 31, although it is understood that they could comprise more or less spikes. The shafts 33 extend through the annulus of each element attached thereto. To facilitate selective attachment and removal from the shafts 33, each element 30 is split into two or more portions (as shown in particular in FIGS. 7 and 8). Should one of the elements or a portion of one of the elements be damaged, worn or otherwise require replacement, the affected portion(s) can be readily detached from the shaft without requiring the wall 32 or one of the banks to be completely disassembled. To mount the elements 30 on the shafts, the discharger 12 comprises a plurality of mounting members 37 or hubs mounted to the shaft 33. The mounting members 37 are provided with apertures 38 for receiving fasteners (for example bolts or screws) to fasten an element 30 to the mounting member. Corresponding apertures 39 are provided in each of the elements 30. The apertures 38 for fastening the elements to respective mounting members 37 are parallel to the longitudinal axis of the shaft 33.

Each mounting member 37 comprises at least two mounting portions 40 which can be mounted to one of the shafts 33. Each mounting portion 40 is generally identical and comprises a casing portion 41 for encasing a portion of one of the shafts 33 and one or more tabs 42 in which the apertures 38 are formed to receive fasteners to fasten an element 30 to the mounting member. In the embodiment shown in FIGS. 7 and 8 the casing portions are semi-cylindrical in shape, but may be of any other suitable shape which generally conforms with a portion of the outer surface of the shafts 33. At least two of the tabs 42 of each of the mounting portions 40 are arranged to abut tabs of adjacent mounting portions. Apertures 43 are provided in the abutting tabs for receiving fasteners to fasten the mounting portions together. These apertures 43 are transverse to the longitudinal axis of the shaft 33. Fastening the mounting portions 40 together in this manner provides a clamping action about the shaft which acts against the mounting members 37 from moving axially with respect to their respective shaft 33.

The mounting members 37 are prevented from rotating relative to their respective shaft 33 by way of a key and groove arrangement. Each shaft 33 is provided with a plurality of grooves 44 generally extending along the length of the shaft, each groove corresponding to one of the elements 30 to be mounted to that shaft. A corresponding groove 45 is provided in one of the mounting portions 40. To lock the mounting members 37 against rotation relative to their respective shaft 33, a key in the form of a rectangular rod 46 is positioned in the space formed between the respective groove 44 in the shaft and the groove 45 in the mounting portion. Assembly of each mounting member 37 occurs by first positioning its respective rod 46 in its respective groove 34 in the shaft 33 prior to placing the mounting portions 40 around the shaft 33 with the groove 45 formed in one of the mounting portions 40 aligned to fit over the rod 46. The mounting portions 40 are subsequently fixed in this arrangement by use of the fasteners and apertures described above.

Although only one mounting portion in each of the mounting members is shown in the Figures as having a groove, it is to be understood that in other embodiments all of the mounting portions could have a groove.

The moving mechanism 13 is shown in the Figures in the form of an endless belt 50 located at the bottom of the container 11. The endless belt 50 is substantially horizontal, but may be inclined. The endless belt has a plurality of ridges or bars 51 provided on its outer surface for pulling along the paper sitting on the belt so that the paper moves with the movement of the belt. The endless belt 50 moves about at least two rollers 52, one of which is a variable drive roller. The speed of the endless belt 50 is used to control the amount of paper discharged from the container 11 by varying the speed of the drive roller and hence the speed of the endless belt 50, whilst the rotational speed of the elements 30 of the discharger remains substantially constant. By changing the speed of the endless belt 50, the amount of paper which is "pushed" onto the elements 30 and thus lifted over the wall 32 is varied. This enables simple control of the rate of paper discharged from the container 11 and thus fed to the recyclable paper processing system.

Mechanisms other than the endless belt may be provided to (variably) move the paper towards the discharger. For example, the moving mechanism 13 may comprise a plate on the end of a ram which extends from the distal end of the container 11 to the discharger 12 to push paper in the container towards the discharger.

FIG. 1 illustrates a control system 60 which can be used to control the operation of the assembly 10. The control system 60 comprises a filling control 61 for the control of the filling of the container 11 with paper and a discharging control 62 for the control of the discharging of paper from the container 11 using the discharger 12. The control system 60 also comprises a controller (PLC) 63 for operating the control system 60 including storing and using any algorithms for operating the assembly 10. The controller 63 operates both the filling control 61 and the discharging control 62.

The filling control 61 comprises a container level sensor 65 for detecting the amount of paper in the container 11. As shown in FIG. 1, the container level sensor 65 is positioned towards the top of the container 11, level with the uppermost shaft 33 in the wall 32 of the discharger 12. Initially, the container 11 is filled with paper at least to the level of the container level sensor 65. As the moving mechanism 13 moves the paper towards the discharger 12, the paper inside the container moves horizontally as a bulk (as opposed to paper being pulled from the top or the bottom). Thus, the container level sensor 65 detects the horizontal position of the bulk of paper relative to the distal end of the container 11 by measuring the distance of the moving bulk of paper from the end of the container. When the sensor 65 detects that the bulk of paper has reached a predetermined horizontal position within the container, the controller 63 signals an indicator such as an alarm to indicate that the container 11 requires filling with paper in order to maintain momentum, or the moving force, of the bulk of paper against the discharger 12. Filling of the container is carried out manually using for example a front end loader as illustrated in FIG. 1.

The discharging control 62 has three control points which are associated with the recyclable paper processing system to which the discharger is discharging paper:

the volume of ground material between the outlet of a paper grinder and the inlet of a water mixer of the recyclable paper processing system, commonly referred to as a surge point 66;

the current load on the motor driving the grinder 67 of the processing system; and the level of paper discharged from the container 11 to a feed conveyor 68 to the processing system as detected by a discharge level sensor 69.

Information from these three control points is used by the controller 63 to determine whether the endless belt 50 of the moving mechanism 13 should move faster or slower so as to discharge more or less paper from the container 11 into the feed to the recyclable paper processing system. Priority is given to the volume of material at the surge point 66 to ensure that the amount of material fed to the rest of the recyclable paper processing system from the grinder is substantially constant. In doing this, optimum operation of the recyclable paper processing system can be obtained.

Figure 11:
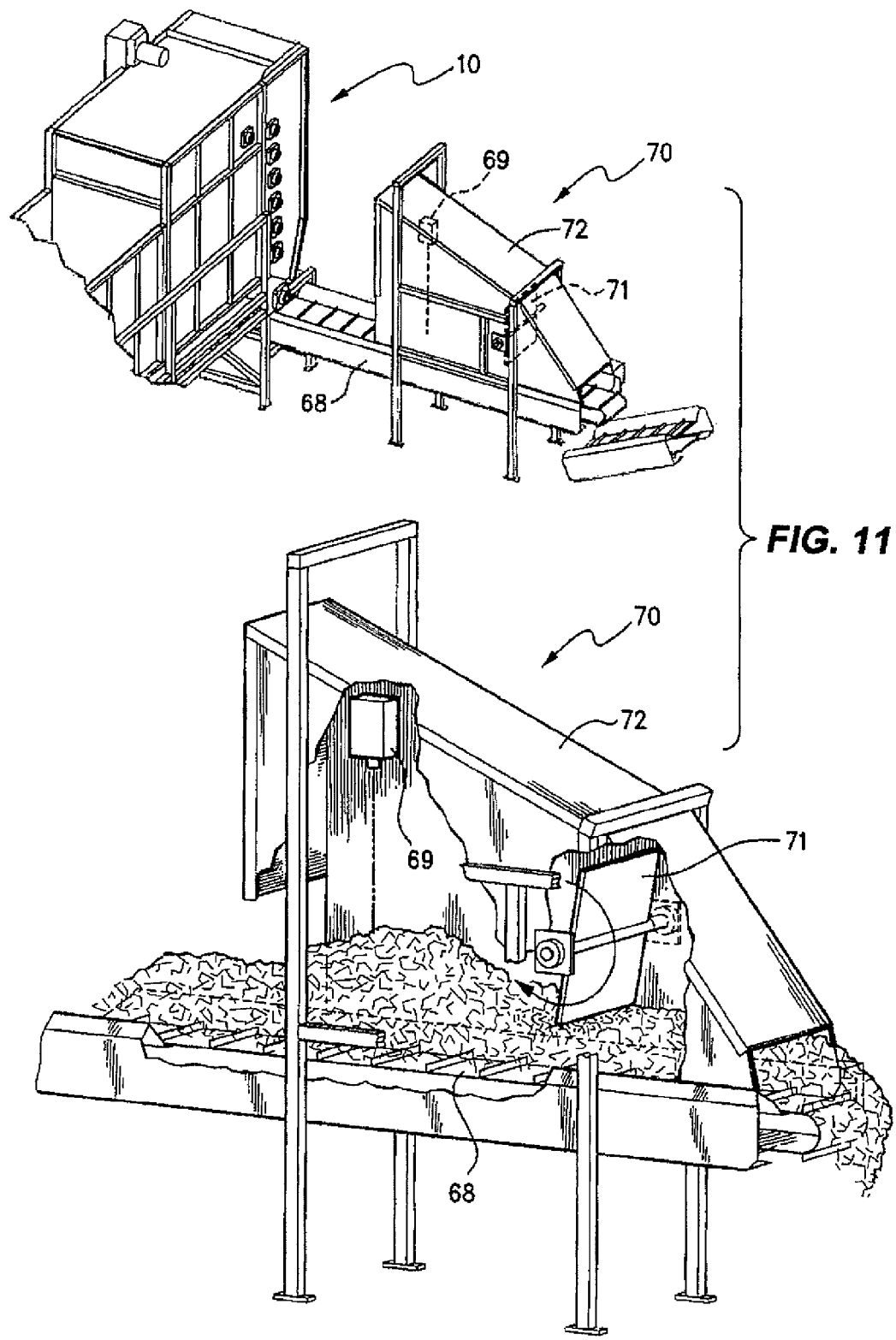
FIG. 11 is a far and near perspective view of a maximum flow limiter which may be incorporated into the assembly of FIG. 1.

Referring specifically to FIG. 11, a maximum flow limiter 70 is shown which may further regulate the flow rate of paper being dispensed to the recyclable paper processing system. The maximum flow limiter 70 may be incorporated into the assembly 10 as part of the discharging control 62. The maximum flow limiter 70 limits the maximum flow of paper being fed by the assembly 10 to the downstream recyclable paper processing system and is located between the discharger 12 and a discharge outlet of the assembly (not shown) from where paper is fed to the processing system. This helps prevent overfeeding of paper to the processing system.

The maximum flow limiter 70 comprises a carrier configured to receive and move paper discharged by the discharger and a barrier located relative to the carrier to define a space between the barrier and the carrier through which the carrier carries the paper. The space limits the maximum volume of paper exiting the assembly relative to the speed the carrier moves the paper. Whilst the carrier of the maximum flow limiter is a form of conveyor and could be an extension of the endless belt 50 in a preferred embodiment shown in FIG. 11, in the embodiment shown the carrier is feed conveyor 68, which is independent of the endless belt 50.

The barrier of the maximum flow limiter 70 comprises a plate member 71, or paddle, which is operated to rotate on a shaft above the feed conveyor 68. The plate member 71 rotates so as to "flick" or "sweep" excess paper back along the feed conveyor 68 in the opposite direction to which it is being carried, and namely upstream relative to the direction of flow along the flow path. Any paper below the rotating edge of the plate member 71 is allowed to pass under the plate member and is fed to the recyclable paper processing system downstream. By flicking excess paper back along the conveyor, the rotating plate member prevents a build up of excess paper around the barrier which, if it occurred, could result in the maximum flow limiter jamming. However, in a variation, the barrier could comprise a fixed plate positioned above the feed conveyor 68. In this variation a space is defined between the bottom edge of the fixed plate and the top surface of the conveyor through which the conveyor carries recyclable paper.

The maximum flow limiter 70 also comprises a housing 72 which houses the rotating plate member 71 and at least part of the feed conveyor 68. The housing 72 prevents paper from being thrown off the feed conveyor 68 as well as minimising the spread of dust from the maximum flow limiter.

The discharge level sensor 69 mentioned above, is mounted to the housing 72 of the maximum flow limiter 70. The discharge level 69 is positioned relative to the rotating plate 71 to appropriately monitor the build up of any paper on the feed conveyor 68 which is being flicked back by the rotating plate; which would indicate that excessive paper is being discharged from the container 11 by the discharger 12. In these circumstances, the discharge level sensor 69 would indicate, via the controller 63, to slow the movement of the endless belt 50. Accordingly, the maximum flow limiter 70 provides an internal control for the assembly 10 to prevent runaway of how much paper is discharged by the discharger 12.

Furthermore by utilising the maximum flow limiter 70, the flow of paper from the assembly 10 is smoothed and in particular spikes of high flow are prevented. This makes operation of the downstream processing system easier and places less stress on the system.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of feeding paper through a paper feeder by conveying paper along a path and regulating the through-flow of paper from the path to dispense the paper from the feeder at a controlled flow rate while continuously moving the paper to avoid blockages; and
    conveying the paper up and over a barrier in the path to regulate the flow of paper, wherein the barrier is a wall of rotatable elements that are driven to convey the paper by traction up and over the wall.

2. The method of claim 1, including conveying paper at a controlled flow rate in response to feedback to a controller from sensors positioned along the path.

3. The method of claim 2, including sensing the amount of paper entering the paper feeder and sensing the amount of paper discharging the paper feeder and adjusting the speed of a conveyor on which the paper is conveyed, in response to sensor feedback.

4. The method of claim 1, including rotating horizontal banks of elements wherein the elements are mounted on a common shaft in each bank, and rotate in the same rotational direction.

5. The method claimed in claim 1, including further regulating the flow of paper discharging from the paper feeder by conveying the paper under a movable barrier that sweeps back any build up of paper being discharged.

6. The method of claim 5, wherein a sensor upstream of the movable barrier senses a build up of paper swept back by the barrier and, through a controller, adjusts the flow rate of paper being conveyed through the paper feeder.

7. A paper feeder comprising a holding container having an inlet through which paper is deposited, a conveyor for moving the paper in the holding container towards a discharge outlet, and a regulator for regulating the through-flow of paper from the conveyor to dispense through the discharge outlet at a controlled flow rate while continuously moving the paper to avoid blockages, wherein the regulator is a barrier up and over which the paper is conveyed, wherein the barrier is a wall of rotatable elements arranged in horizontal banks and wherein the elements are driven to rotate to move the paper up and over the wall, and toward the discharge outlet.

8. The paper feeder of claim 7, further comprising a control system for controlling the flow rate of paper through the paper feeder in response to feedback from sensors positioned in the paper feeder and/or in a downstream process from the paper feeder.

9. The paper feeder of claim 7, wherein the barrier is positioned inside the holding container and at the end of an endless belt conveyor that conveys paper towards the discharge outlet.

10. The paper feeder of claim 7, wherein the wall of rotatable elements is inclined vertically against a direction of flow of the paper.

11. The paper feeder of claim 7, wherein the elements are mounted on a common shaft in each bank and are horizontally staggered relative to the elements in the bank immediately above and below.

12. The paper feeder of claim 11, wherein each rotatable element comprises at least two engageable portions to enable each element to be individually mounted onto, and dismounted from, a shaft.

13. The paper feeder claimed in claim 7, wherein a tipper comprising at least one bank of rotatable elements is positioned near an upper end of the barrier whereby the tipper elements are driven to rotate to assist in conveying the paper over the barrier.

14. The paper feeder claimed in claim 7, wherein the rotatable elements comprise an annular 'star'-shaped disc whereby the spikes defining the star points catch the paper to convey the paper upwardly.

15. The paper feeder claimed in claim 7, including a movable barrier under which paper is conveyed, the movable barrier being positioned between the regulator and the discharge outlet moves to sweep paper back upstream of the discharge outlet in case of a build up of paper.

16. The paper feeder of claim 15, wherein a sensor located upstream of the barrier senses build up of paper swept back by the barrier, and based on feedback from the sensor, the controller adjusts a speed of the conveyor.

\* \* \* \* \*